United States Patent [19]
Kanamori

[11] Patent Number: 4,877,314
[45] Date of Patent: Oct. 31, 1989

[54] OBJECTIVE LENS SYSTEM FOR ENDOSCOPES

[75] Inventor: Iwao Kanamori, Tokyoto, Japan

[73] Assignee: Olympus Optical Co., Ltd., Tokyo, Japan

[21] Appl. No.: 198,057

[22] Filed: May 24, 1988

[30] Foreign Application Priority Data

May 25, 1987 [JP] Japan .................. 62-125859

[51] Int. Cl.⁴ .................. G02B 15/06; G02B 9/60; G02B 9/62
[52] U.S. Cl. .................. 350/422; 350/474
[58] Field of Search .................. 350/422, 474, 414

[56] References Cited

U.S. PATENT DOCUMENTS 4,749,264 6/1988 Taniguchi et al. .................. 350/422

FOREIGN PATENT DOCUMENTS 47-23224 6/1972 Japan .

Primary Examiner—Bruce Y. Arnold
Assistant Examiner—Rebecca D. Gass
Attorney, Agent, or Firm—Cushman, Darby & Cushman

[57] ABSTRACT

A compact objective lens system for endoscopes designed for a field angle smaller than 40°, having favorable corrected aberrations and comprising a plural number of lens components, the first lens component arranged on the extreme object side out of said plural number of lens components having positive refractive power.

16 Claims, 11 Drawing Sheets

OBJECTIVE LENS SYSTEM FOR ENDOSCOPES

BACKGROUND OF THE INVENTION (a) Field of the Invention

The present invention relates to an objective lens system for endoscopes.

(b) Description of the Prior Art

As one of the conventional objective lens systems for endoscopes, there is already known the vari-focal optical system disclosed by the specification of U.S. Pat. No. 3637282. This optical system is so adapted as to form images of an object OB at different magnification levels on the end surface of incidence of an image guide fiber bundle 1, as shown in FIG. 1, by arranging a telecentric type of master lens consisting of a lens OL and an aperture stop S located in the vicinity of the front focal point thereof before the image guide fiber bundle 1, and further arranging, in a mutually replaceable mode, attachment lenses of a tele type of lens system consisting of a lens AF and lens AL, and a reverse tele type of lens system consisting of a lens AF' and a lens AL' before said master lens.

In an objective lens system having the composition described above, aberrations are corrected favorably in the master lens itself in most cases, and it is necessary to suppress aberration production in the attachment lenses arranged before the master lens so that aberrations are corrected favorably in the objective system as a whole.

SUMMARY OF THE INVENTION

A primary object of the present invention is to provide an objective lens system for endoscopes having favorably corrected aberrations. The objective lens system for endoscopes according to the present invention comprises a plural number of lens components including a lens component arranged on the extreme object side and having positive refractive power, and has a field angle smaller than 40° as a whole.

In case of an objective lens system having a narrow field angle of 40° or smaller, such as the objective lens system according to the present invention, said lens system can be made more compact by selecting the tele type of composition rather than the retrofocus type of composition. When focal length of the objective lens system is to be varied by using the adapter lenses (adapter method), it is advantageous for users that the first lens component arranged on the extreme object side is designed so as to have positive refractive power since the field angle is not narrowed when only the master lens is used for observation unlike the case of the retrofocus type of optical system where the focal length is varied with the master lens arranged on the image side.

For the reason described above, the objective lens system according to the present invention is designed in such a manner that the first lens component has positive refractive power.

Further, the objective lens system according to the present invention is designed in such a manner that said first lens component has a focal length $f_I$ satisfying the following condition (1):

$$0.3 < f_I/f < 200 \tag{1}$$

wherein the reference symbol f represents focal length of the objective lens system as a whole.

If $f_I/f$ is smaller than 0.3 in the condition (1), lower coma will be aggravated, thereby degrading image quality. If $f_I/f$ is larger than 200, in contrast, the objective lens system will undesirably have a long total length and a large outside diameter.

Next, focal length of the objective lens system can be varied by arranging a master lens on the image side of said first lens component and designing the master lens as an adapter type which is attachable and detachable to and from the master lens. In this case, the attachable and detachable first lens component having positive refractive power provides a merit that field angle is not narrowed when the master lens only is used as described above.

When the objective lens system according to the present invention comprises the first lens component having refractive power and a second lens component havig negative refractive power arranged in the order from the object side, this composition provides merits that aberrations can be corrected easily, for example, coma produced by the first lens component having positive refractive power can be corrected by the second negative lens component. In this case, it is desirable to set focal length $f_I$ of the first lens component so as to satisfy the above-mentioned condition (1) and, at the same time, to select focal length $f_{II}$ of the second lens component so as to satisfy the following condition (2):

$$0.05 < |f_{II}|/f < 100 \tag{2}$$

If $|f_{II}|/f$ is smaller than 0.05 defined as the lower limit of the condition (2), the second lens component will have too strong power and can hardly be manufactured in practice, and astigmatism will undesirably be produced by the second lens component. If $|f_{II}|/f$ is larger than 100, in contrast, the second lens component will have too weak power to perform the function of a concave lens component and can hardly correct coma sufficiently.

Focal length of the objective lens system can be varied by the adapter method when a master lens is arranged on the image side of the lens system comprising the first lens component having positive refractive power and a second lens component having negative refractive power as described above. In this case, it is preferable to select a method to design the first lens component as a lens component which is attachable and detachable, or a method to design the first and second lens components as lens components which are attachable and detachable.

When the adapter method is selected for the objective lens system, and the first lens component or both the first and second lens components are designed as the attachable and detachable type, it is preferable to prepare plural types of adapter lenses so as to permit selecting plural focal lengths. Though focal point is varied by using different types of adapter lenses in this case, such variation is rather convenient since it makes refocusing unnecessary for the objective lens system for endoscopes to observe objects located at different distances. Further, plural types of adapter lenses permit selecting plural field angles, for example, of 10°, 20°, 40°, 60°, 80°, 100° and 120° for the objective lens system. Accordingly, preparation of plural adapter lenses is effective for industrial endoscopes to be used for observing various types of objects located at various distances.

In the objective lens system for endoscopes comprising the first lens component, second lens component and master lens, it is further preferable, from viewpoints of aberration correction, etc., to select the focal length $f_M$ of the master lens so as to satisfy the following condition (3):

$$0.1 < f_M/f < 1 \tag{3}$$

The condition (3) is equivalent to a fact that elongation of focal length by the adapter lenses (the first lens component and second lens component) is within a range from x1 to x10.

If the lower limit of the condition (3) is exceeded, i.e., magnification ratio of the adapter lenses is larger than x10, the second lens component will have too strong power and aberrations can hardly be corrected. If the second lens component has weak power in such a case, the first lens component will have weaker power, thereby inevitably enlarging the adapter lenses. If $f_M/f$ exceeds the upper limit of 1 in the condition (3), in cotrast, magnification ratio by the adapter lenses will be lower than x1, whereby the optical system composed of the master lens and the adapter lenses attached thereto will undesirably contracts the images observed through the master lens only.

On the basis of the foregoing descriptions, the objective lens system capable of accomplishing the object of the present invention may have the composition shown in FIG. 2 or FIG. 3. Speaking concretely, the objective lens system comprises the first lens component I having positive refractive power, a second lens component II having negative refractive power, the master lens M having positive refractive power, a plane parallel plate P (FIG. 2) or viewing direction deflecting prisms P' (FIG. 3) arranged between the first lens component or second lens component, a aperture stop $S_1$ arranged between the plane parallel plate P or viewing direction deflecting prisms P' and the second lens component, a flare stop $S_2$ arranged between the plane parallel plate P or viewing direction deflecting prisms P' and the first lens component I, a cover glass C arranged after the master lens M, and an image guide IG (FIG. 2) or solid-state image sensor IS (FIG. 3).

Since the objective lens system having the lens composition shown in FIG. 2 or FIG. 3 is designed as a tele type of optical system comprising the first convex lens component I and the second concave lens component II, said lens system is compacter than a retrofocus type of objective lens system when field angle is 40° or narrower as described above and is very advantageous for use in endoscopes. Further, when the adapter method is adopted, the retrofocus type of objective lens system will make field angle narrower for images observed through the master lens only, but the objective lens system having the composition shown in FIG. 2 or FIG. 3 is free from such a defect.

In the objective lens system according to the present invention, it is desirable to design the master lens so as to be movable back and forth. The tele type of optical systems such as the objective lens system according to the present invention generally have a common defect of shallow depth of focus. Tele type of optical systems having long focal lengths generally have shallower depths of field. Accordingly, it is possible to perform focusing by moving the master lens when the master lens is so designed as to be movable as described above. Each time the first lens component or both the first and second lens components are replaced with others as described above, such a design brings the objective lens system into focus on another object located at a definite distance to allow to observe the object without refocusing and, in addition, other objects while focusing the master lens.

In the objective lens system according to the present invention, the positive lens element in the first lens component I should preferably have Abbe's number $\nu_I$ satisfying the following condition (4):

$$\nu_I > 32 \tag{4}$$

If Abbe's number $\nu_I$ is larger than 32, lateral chromatic aberration and longitudinal chromatic aberration will be aggravated, therby remarkably degrading image quality.

Further, when the plane parallel plate P or viewing direction deflecting prisms P' is interposed between the first lens component and the second lens component as shown in FIG. 3, Abbe's number $\nu_p$ of the material therof should desirably satisfy the following condition (5):

$$\nu_p < 55 \tag{5}$$

When the condition (5) is satisfied, the lateral chromatic aberration and longitudinal chromatic aberration produced due to the difference in refractive index at different wavelengths in the first lens component having positive refractive power can be cancelled by the lateral chromatic aberration and longitudinal chromatic aberration produced in the plane parallel plate P. If $\nu_p$ is larger than 55, the above-described correcting function will be insufficient since the plane parallel plate or the prisms have low dispersing power.

The plane parallel plate or the prisms may be arranged between the second lens component II and the master lens M. Also in such a case, the above-mentioned condition (5) should desirably be satisfied.

Furthermore, in the objective lens system according to the present invention, it is possible to correct coma by using an aspherical surface on the first lens component I.

As the first lens component I, it is preferable to use a positive meniscus lens having a convex surface on the object side, convexo-plane lens or a biconvex lens having a small radius of curvature on the surface on the object side. As the second lens component II, it is preferable to use a biconcave lens or a negative meniscus lens having a convex surface on the object side.

In the object lens system according to the present invention, the object side surface of the convex lens element in the first lens component I should desirably satisfy the following condition (6):

$$0.01 < \frac{n_p - 1}{R_p} \cdot f < 10 \tag{6}$$

wherein the reference symbol $R_p$ represents radius of curvature on the object side surface of the above-mentioned convex lens element and the reference symbol $n_p$ designates refractive index of the above-mentioned convex lens element.

If the lower limit of the condition (6) is exceeded, total length of the objective lens system will undesirably be prolonged. If the upper limit of the condition (6) is exceeded, in contrast, lower coma will be aggravated, thereby degrading image quality. In addition, $R_p$ will be minimized, thereby making the above-mentioned convex lens element hardly manufacturable in practice.

Moreover, optical path length D reserved between the first lens component I and the second lens component II should desirably satisfy the following condition (7):

$$0.1 < D/f < 10 \tag{7}$$

If D/f is smaller than 0.1 in the condition (7), the first lens component I and the second lens component II will have strong refractive powers respectively, and refract rays remarkable, whereby lower coma will be produced and degrade image quality. If D/f is larger than 10, in contrast, the objective lens system will have a long total length and a large outside diameter, whereby said objective lens system will not be compact enough for use in endoscopes.

DETAILED DESCRIPTION OF THE PREFERRED EMBODIMENTS

Figure 1:
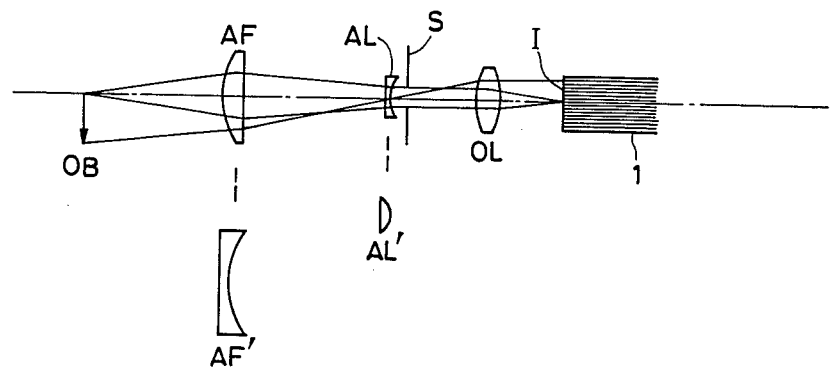
FIG. 1 shows a sectional view illustrating the composition of the conventional objective lens system for endoscopes.
Figure 2:
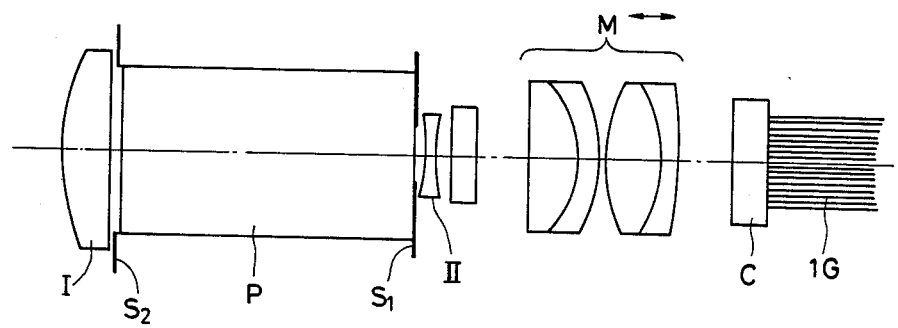
FIG. 2 and FIG. 3 show sectional views illustrating the composition of the objective lens system for endoscopes according to the present invention.
Figure 3:
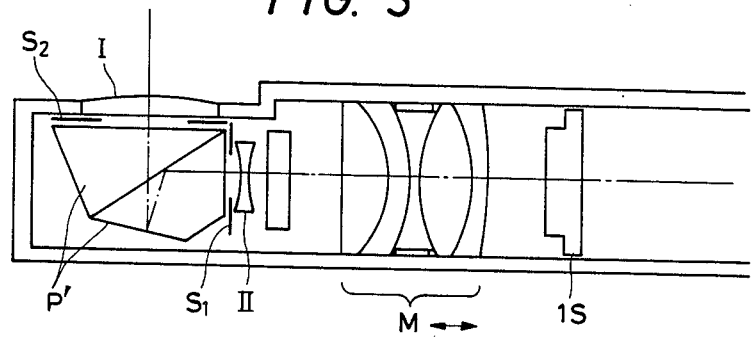

Now, the present invention will be described detailedly with reference to the preferred embodiments.

| Embodiment 1 |
|---|
| $f = 1, F/2.859, 2\omega = 9.662°$ |
| $IH = 0.0908, S = -6.0111$ |

| | | |
|---|---|---|
| $r_1 = 0.5396$ | | |
| $d_1 = 0.1202$ | $n_1 = 1.88300$ | $\nu_1 = 40.78$ |
| $r_2 = \infty$ | | |
| $d_2 = 0.0180$ | | |
| $r_3 = \infty$ | | |
| $d_3 = 0.6612$ | $n_2 = 1.88300$ | $\nu_2 = 40.78$ |
| $r_4 = \infty$ (stop) | | |
| $d_4 = 0.0120$ | | |
| $r_5 = -0.1981$ | | |
| $d_5 = 0.0361$ | $n_3 = 1.72916$ | $\nu_3 = 54.68$ |
| $r_6 = 0.4501$ | | |
| $d_6 = 0.0216$ | | |
| $r_7 = \infty$ | | |
| $d_7 = 0.0601$ | $n_4 = 1.88300$ | $\nu_4 = 40.78$ |
| $r_8 = \infty$ | | |
| $d_8 = 0.0422$ | | |
| $r_9 = \infty$ | | |
| $d_9 = 0.1070$ | $n_5 = 1.72916$ | $\nu_5 = 54.68$ |
| $r_{10} = -0.2371$ | | |
| $d_{10} = 0.0505$ | $n_6 = 1.84666$ | $\nu_6 = 23.78$ |
| $r_{11} = -0.3420$ | | |
| $d_{11} = 0.0156$ | | |
| $r_{12} = 0.3881$ | | |
| $d_{12} = 0.1286$ | $n_7 = 1.61800$ | $\nu_7 = 63.38$ |
| $r_{13} = -0.2807$ | | |
| $d_{13} = 0.0361$ | $n_8 = 1.78472$ | $\nu_8 = 25.71$ |
| $r_{14} = -1.0095$ | | |
| $d_{14} = 0.1982$ | | |
| $r_{15} = \infty$ | | |
| $d_{15} = 0.0842$ | $n_9 = 1.51633$ | $\nu_9 = 64.15$ |
| $r_{16} = \infty$ | | |
| $f_I/f = 0.611$ $|f_{II}|/f = 0.184$ $f_M/f = 0.274$ | | |

| Embodiment 2 |
|---|
| $f = 1, F/2.515, 2\omega = 19.612°$ |
| $IH = 0.1589, S = -5.5999$ |

| | | |
|---|---|---|
| $r_1 = 0.8050$ | | |
| $d_1 = 0.1778$ | $n_1 = 1.51633$ | $\nu_1 = 64.15$ |
| $r_2 = \infty$ | | |
| $d_2 = 0.0252$ | | |
| $r_3 = \infty$ | | |
| $d_3 = 1.1242$ | $n_2 = 1.88300$ | $\nu_2 = 40.78$ |
| $r_4 = \infty$ (stop) | | |
| $d_4 = 0.0098$ | | |
| $r_5 = -1.4451$ | | |
| $d_5 = 0.0560$ | $n_3 = 1.51633$ | $\nu_3 = 64.15$ |
| $r_6 = 1.4451$ | | |
| $d_6 = 0.0462$ | | |
| $r_7 = \infty$ | | |
| $d_7 = 0.0700$ | $n_4 = 1.88300$ | $\nu_4 = 40.78$ |
| $r_8 = \infty$ | | |
| $d_8 = 0.2542$ | | |
| $r_9 = \infty$ | | |
| $d_9 = 0.2268$ | $n_5 = 1.72916$ | $\nu_5 = 54.68$ |
| $r_{10} = -0.3801$ | | |
| $d_{10} = 0.0742$ | $n_6 = 1.84666$ | $\nu_6 = 23.78$ |
| $r_{11} = -0.5600$ | | |
| $d_{11} = 0.0210$ | | |
| $r_{12} = 0.7630$ | | |
| $d_{12} = 0.2786$ | $n_7 = 1.58913$ | $\nu_7 = 60.97$ |
| $r_{13} = -0.4298$ | | |
| $d_{13} = 0.0868$ | $n_8 = 1.84666$ | $\nu_8 = 23.78$ |
| $r_{14} = -0.9660$ | | |
| $d_{14} = 0.2008$ | | |
| $r_{15} = \infty$ | | |
| $d_{15} = 0.0980$ | $n_9 = 1.51633$ | $\nu_9 = 64.15$ |
| $r_{16} = \infty$ | | |
| $f_I/f = 1.559$, $|f_{II}|/f = 1.39$, $f_M/f = 0.477$ | | |

| Embodiment 3 |
|---|
| $f = 1, F/2.593, 2\omega = 35.000°$ |
| $IH = 0.2992, S = -10.5430$ |

| | | |
|---|---|---|
| $r_1 = 7.7504$ | | |
| $d_1 = 0.3347$ | $n_1 = 1.51633$ | $\nu_1 = 64.15$ |
| $r_2 = \infty$ | | |
| $d_2 = 0.0474$ | | |
| $r_3 = \infty$ | | |
| $d_3 = 2.1165$ | $n_2 = 1.88300$ | $\nu_2 = 40.78$ |
| $r_4 = \infty$ (stop) | | |
| $d_4 = 0.0185$ | | |
| $r_5 = -26.3574$ | | |
| $d_5 = 0.1054$ | $n_3 = 1.51633$ | $\nu_3 = 64.15$ |
| $r_6 = 26.3574$ | | |
| $d_6 = 0.0870$ | | |
| $r_7 = \infty$ | | |
| $d_7 = 0.1318$ | $n_4 = 1.88300$ | $\nu_4 = 40.78$ |
| $r_8 = \infty$ | | |
| $d_8 = 0.4264$ | | |
| $r_9 = \infty$ | | |
| $d_9 = 0.4270$ | $n_5 = 1.72916$ | $\nu_5 = 54.68$ |

-continued

| | | |
|---|---|---|
| $r_{10} = -0.7156$ | | |
| $d_{10} = 0.1397$ | $n_6 = 1.84666$ | $\nu_6 = 23.78$ |
| $r_{11} = -1.0543$ | | |
| $d_{11} = 0.0395$ | | |
| $r_{12} = 1.4365$ | | |
| $d_{12} = 0.5245$ | $n_7 = 1.58913$ | $\nu_7 = 60.97$ |
| $r_{13} = -0.8092$ | | |
| $d_{13} = 0.1634$ | $n_8 = 1.84666$ | $\nu_8 = 23.78$ |
| $r_{14} = -1.8187$ | | |
| $d_{14} = 0.4302$ | | |
| $r_{15} = \infty$ | | |
| $d_{15} = 0.1845$ | $n_9 = 1.51633$ | $\nu_9 = 64.15$ |
| $r_{16} = \infty$ | | |

$f_I/f = 15.011, |f_{II}|/f = 25.506, f_M/f = 0.899$

Embodiment 4

$f = 1, F/2.502, 2\omega = 21.698°$
$IH = 0.185, S = -4.3535$

| | | |
|---|---|---|
| $r_1 = 0.9491$ | | |
| $d_1 = 0.1850$ | $n_1 = 1.69680$ | $\nu_1 = 55.52$ |
| $r_2 = \infty$ | | |
| $d_2 = 0.0435$ | | |
| $r_3 = \infty$ | | |
| $d_3 = 0.6095$ | $n_2 = 1.80610$ | $\nu_2 = 40.95$ |
| $r_4 = \infty$ | | |
| $d_4 = 0.0653$ | | |
| $r_5 = -1.7941$ | | |
| $d_5 = 0.1088$ | $n_3 = 1.64769$ | $\nu_3 = 33.80$ |
| $r_6 = 1.1230$ | | |
| $d_6 = 0.0435$ | | |
| $r_7 = \infty$ (stop) | | |
| $d_7 = 0.1088$ | $n_4 = 1.51633$ | $\nu_4 = 64.15$ |
| $r_8 = \infty$ | | |
| $d_8 = 0.2177$ | | |
| $r_9 = -3.2788$ | | |
| $d_9 = 0.0871$ | $n_5 = 1.78472$ | $\nu_5 = 25.71$ |
| $r_{10} = 1.0923$ | | |
| $d_{10} = 0.2177$ | $n_6 = 1.69680$ | $\nu_6 = 55.52$ |
| $r_{11} = -0.6532$ | | |
| $d_{11} = 0.0435$ | | |
| $r_{12} = 0.7175$ | | |
| $d_{12} = 0.2830$ | $n_7 = 1.58913$ | $\nu_7 = 60.97$ |
| $r_{13} = -0.5087$ | | |
| $d_{13} = 0.0871$ | $n_8 = 1.78472$ | $\nu_8 = 25.71$ |
| $r_{14} = -1.1008$ | | |
| $d_{14} = 0.2815$ | | |
| $r_{15} = \infty$ | | |
| $d_{15} = 0.2177$ | $n_9 = 1.62004$ | $\nu_9 = 36.25$ |
| $r_{16} = \infty$ | | |

$f_I/f = 1.362, |f_{II}|/f = 1.051, f_M/f = 0.547$

Embodiment 5

$f = 1, F/2.668, 2\omega = 13.098°$
$IH = 0.1240, S = -6.2177$

| | | |
|---|---|---|
| $r_1 = \infty$ | | |
| $d_1 = 0.1717$ | $n_1 = 1.51633$ | $\nu_1 = 64.15$ |
| $r_2 = -1.9275$ | | |
| $d_2 = 0.0258$ | | |
| $r_3 = 0.5198$ | | |
| $d_3 = 0.2986$ | $n_2 = 1.65160$ | $\nu_2 = 58.52$ |
| $r_4 = -1.8294$ | | |
| $d_4 = 0.0688$ | $n_3 = 1.80518$ | $\nu_3 = 25.43$ |
| $r_5 = 1.9696$ | | |
| $d_5 = 0.2585$ | | |
| $r_6 = -1.4308$ | | |
| $d_6 = 0.0286$ | $n_4 = 1.72916$ | $\nu_4 = 54.68$ |
| $r_7 = 0.3148$ | | |
| $d_7 = 0.0572$ | | |
| $r_8 = \infty$ (stop) | | |
| $d_8 = 0.0057$ | | |
| $r_9 = -0.6640$ | | |
| $d_9 = 0.1240$ | $n_5 = 1.58913$ | $\nu_5 = 60.97$ |
| $r_{10} = -0.1236$ | | |
| $d_{10} = 0.1192$ | $n_6 = 1.66998$ | $\nu_6 = 39.32$ |
| $r_{11} = -0.4342$ | | |
| $d_{11} = 0.1898$ | | |
| $r_{12} = 4.0835$ | | |
| $d_{12} = 0.1097$ | $n_7 = 1.80610$ | $\nu_7 = 40.95$ |
| $r_{13} = -0.4992$ | | |
| $d_{13} = 0.0143$ | | |
| $r_{14} = 0.4058$ | | |
| $d_{14} = 0.1812$ | $n_8 = 1.60311$ | $\nu_8 = 60.70$ |

-continued

| | | |
|---|---|---|
| $r_{15} = -0.4058$ | | |
| $d_{15} = 0.0572$ | $n_9 = 1.80518$ | $\nu_9 = 25.43$ |
| $r_{16} = 0.6743$ | | |
| $d_{16} = 0.2022$ | | |
| $r_{17} = \infty$ | | |
| $d_{17} = 0.0668$ | $n_{10} = 1.56384$ | $\nu_{10} = 60.69$ |
| $r_{18} = \infty$ | | |

$f_I/f = 0.847, |f_{II}|/f = 0.351, f_M/f = 0.344$

Embodiment 6

$f = 1.081, F/3.506, 2\omega = 8.884°$
$IH = 0.0868, S = \infty$

| | | |
|---|---|---|
| $r_1 = 0.4139$ | | |
| $d_1 = 0.1966$ | $n_1 = 1.51633$ | $\nu_1 = 64.15$ |
| $r_2 = 3.4436$ | | |
| $d_2 = 0.2345$ | | |
| $r_3 = 0.1934$ | | |
| $d_3 = 0.1449$ | $n_2 = 1.51633$ | $\nu_2 = 64.15$ |
| $r_4 = 0.1798$ | | |
| $d_4 = 0.0115$ | | |
| $r_5 = \infty$ (stop) | | |
| $d_5 = 0.0115$ | | |
| $r_6 = -0.1972$ | | |
| $d_6 = 0.0345$ | $n_3 = 1.58913$ | $\nu_3 = 60.97$ |
| $r_7 = 0.2367$ | | |
| $d_7 = 0.0207$ | | |
| $r_8 = \infty$ | | |
| $d_8 = 0.0575$ | $n_4 = 1.88300$ | $\nu_4 = 40.78$ |
| $r_9 = \infty$ | | |
| $d_9 = 0.1891$ | | |
| $r_{10} = \infty$ | | |
| $d_{10} = 0.1023$ | $n_5 = 1.72916$ | $\nu_5 = 54.68$ |
| $r_{11} = -0.2267$ | | |
| $d_{11} = 0.0483$ | $n_6 = 1.84666$ | $\nu_6 = 23.78$ |
| $r_{12} = -0.3271$ | | |
| $d_{12} = 0.0149$ | | |
| $r_{13} = 0.3711$ | | |
| $d_{13} = 0.1230$ | $n_7 = 1.61800$ | $\nu_7 = 63.38$ |
| $r_{14} = -0.2685$ | | |
| $d_{14} = 0.0345$ | $n_8 = 1.78472$ | $\nu_8 = 25.71$ |
| $r_{15} = -0.9654$ | | |
| $d_{15} = 0.0408$ | | |
| $r_{16} = \infty$ | | |
| $d_{16} = 0.0805$ | $n_9 = 1.51633$ | $\nu_9 = 64.15$ |
| $r_{17} = \infty$ | | |

$f_I/f = 0.533, |f_{II}|/f = 0.164, f_M/f = 0.242$

Values varied by focusing A $f = 1, F/3.144, 2\omega = 10.002°$
$IH = 0.0868, S = -11.4969$
$d_9 = 0.1084, d_{15} = 0.1215$
$f_I/f = 0.576, |f_{II}|/f = 0.177, f_M/f = 0.262$ Values varied by focusing B $f = 0.936, F/3.334, 2\omega = 9.612°$
$IH = 0.0868, S = -5.3054$
$d_9 = 0.0345, d_{15} = 0.1954$
$f_I/f = 0.615, |f_{II}|/f = 0.189, f_M/f = 0.242$ Embodiment 7

$f = 1.07, F/3.051, 2\omega = 9.784°$
$IH = 0.0925, S = \infty$

| | | |
|---|---|---|
| $r_1 = 0.4206$ | | |
| $d_1 = 0.0758$ | $n_1 = 1.51633$ | $\nu_1 = 64.15$ |
| $r_2 = 0.7460$ | | |
| $d_2 = 0.0489$ | | |
| $r_3 = 0.4673$ | | |
| $d_3 = 0.1223$ | $n_2 = 1.51633$ | $\nu_2 = 64.15$ |
| $r_4 = \infty$ | | |
| $d_4 = 0.0082$ | | |
| $r_5 = \infty$ | | |
| $d_5 = 0.5153$ | $n_3 = 1.84666$ | $\nu_3 = 23.78$ |
| $r_6 = \infty$ (stop) | | |
| $d_6 = 0.0163$ | | |
| $r_7 = -0.2218$ | | |
| $d_7 = 0.0285$ | $n_4 = 1.51633$ | $\nu_4 = 64.15$ |
| $r_8 = 0.2218$ | | |
| $d_8 = 0.0285$ | | |
| $r_9 = \infty$ | | |
| $d_9 = 0.0408$ | $n_5 = 1.88300$ | $\nu_5 = 40.78$ |
| $r_{10} = \infty$ | | |
| $d_{10} = 0.2121$ | | |
| $r_{11} = \infty$ | | |
| $d_{11} = 0.1321$ | $n_6 = 1.72916$ | $\nu_6 = 54.68$ |

-continued $r_{12} = -0.2214$
$d_{12} = 0.0432$  $n_7 = 1.84666$  $\nu_7 = 23.78$
$r_{13} = -0.3261$
$d_{13} = 0.0122$
$r_{14} = 0.4444$
$d_{14} = 0.1623$  $n_8 = 1.58913$  $\nu_8 = 60.97$
$r_{15} = -0.2503$
$d_{15} = 0.0506$  $n_9 = 1.84666$  $\nu_9 = 23.78$
$r_{16} = -0.5626$
$d_{16} = 0.0528$
$r_{17} = \infty$
$d_{17} = 0.0571$  $n_{10} = 1.51633$  $\nu_{10} = 64.15$
$r_{18} = \infty$ $f_I/f = 0.59$, $|f_{II}|/f = 0.196$, $f_M/f = 0.26$ Values varied by focusing A $f = 1$, F/2.664, $2\omega = 11.188°$
IH $= 0.0925$, S $= -10.1916$
$d_{10} = 0.1274$, $d_{16} = 0.1375$
$f_I/f = 0.631$, $|f_{II}|/f = 0.21$, $f_M/f = 0.278$ Values varied by focusing B $f = 0.926$, F/2.879, $2\omega = 10.544°$
IH $= 0.0925$, S $= -3.8556$
$d_{10} = 0.0245$, $d_{16} = 0.2404$
$f_I/f = 0.681$, $|f_{II}|/f = 0.227$, $f_M/f = 0.3$ Embodiment 8

$f = 1$, F/3.165, $2\omega = 9.940°$
IH $= 0.0875$, S $= \infty$ $r_1 = 0.5304$  (Aspherical surface)
$d_1 = 0.0979$  $n_1 = 1.88300$  $\nu_1 = 40.78$
$r_2 = \infty$
$d_2 = 0.0139$
$r_3 = \infty$
$d_3 = 0.6191$  $n_2 = 1.88300$  $\nu_2 = 40.78$
$r_4 = \infty$ (stop)
$d_4 = 0.0093$
$r_5 = -0.3808$
$d_5 = 0.0231$  $n_3 = 1.51633$  $\nu_3 = 64.15$
$r_6 = 0.1626$
$d_6 = 0.0293$
$r_7 = \infty$
$d_7 = 0.0386$  $n_4 = 1.88300$  $\nu_4 = 40.78$
$r_8 = \infty$
$d_8 = 0.2171$
$r_9 = \infty$
$d_9 = 0.1249$  $n_5 = 1.72916$  $\nu_5 = 54.68$
$r_{10} = -0.2093$
$d_{10} = 0.0409$  $n_6 = 1.84666$  $\nu_6 = 23.78$
$r_{11} = -0.3084$
$d_{11} = 0.0116$
$r_{12} = 0.4202$
$d_{12} = 0.1534$  $n_7 = 1.58913$  $\nu_7 = 60.97$
$r_{13} = -0.2367$
$d_{13} = 0.0478$  $n_8 = 1.84666$  $\nu_8 = 23.78$
$r_{14} = -0.5320$
$d_{14} = 0.0335$
$r_{15} = \infty$
$d_{15} = 0.0540$  $n_9 = 1.51633$  $\nu_9 = 64.15$
$r_{16} = \infty$ $f_I/f = 0.594$, $|f_{II}|/f = 0.218$, $f_M/f = 0.263$ Aspherical coefficient $C = 1/R$, $P = 1$
$A_2 = 0.10137 \times 10^{-1}$, $A_4 = -0.10189$
$A_6 = 0.11959 \times 10$, $A_8 = -0.39740 \times 10$
$A_{10} = 0.69975 \times 10^{-3}$, $A_{12} = -0.13322 \times 10^{-3}$
$A_{14} = -0.15945 \times 10^{-4}$, $A_{16} = 0.85493 \times 10^{-7}$
$A_{18} = -0.16550 \times 10^{-6}$, $A_{20} = 0.16233 \times 10^{-8}$ wherein the reference symbols $r_1, r_2, \ldots$ represent radii of curvature on the respective lens surfaces, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

Figure 4:
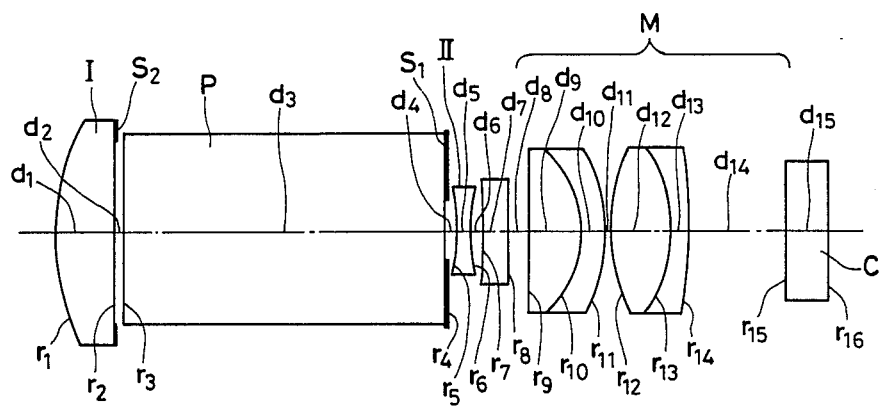
FIG. 4 through FIG. 8 show sectional views illustrating compositions of Embodiments 1 through 5 of the objective lens system for endoscopes according to the present invention.

The Embodiment 1 has the composition shown in FIG. 4, i.e., comprises in the order from the object side a first positive lens component I, a flare stop $S_2$, a plane parallel plate P, an aperture stop $S_1$, a second negative lens component II, a master lens M and a cover glass C. The first lens component I, flare stop $S_2$, plane parallel plate P, aperture stop $S_1$ and second lens component II are designed so as to be attachable and detachable as adapters.

Figure 16:
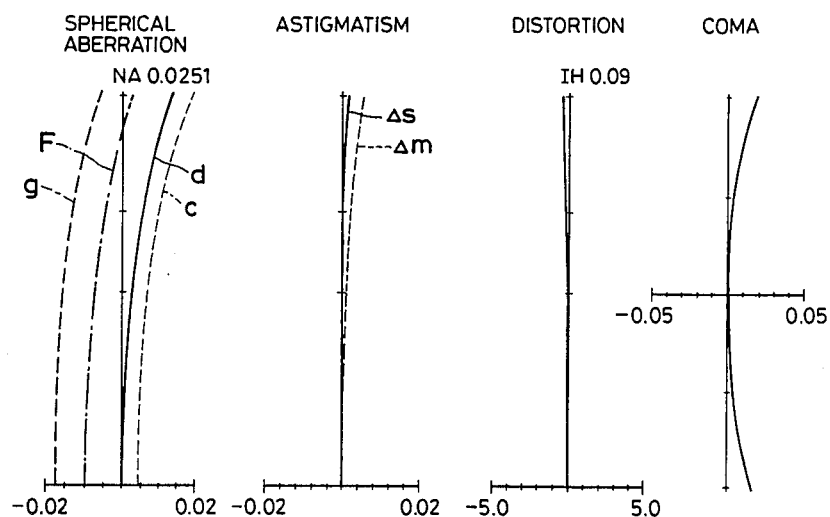
FIG. 16 through FIG. 20 show curves illustrating aberration characteristics of the Embodiments 1 through 5 of the present invention.

In this embodiment, the first lens component I has strong power and the objective lens system is designed for a field angle of 10°. The plane parallel plate P corrects the chromatic aberration produced in the first lens component I. Further, the flare stop $S_2$ serves to obtain sharp images by cutting off detrimental rays irregularly reflected by the outer circumferential surfaces of the lens elements and inside surface of the lens frames. The aperture stop $S_1$ is arranged on the side of the adapter to prevent the rays from passing through high portions in the adapter, thereby keeping proper balance between the adapter lenses and master lens, and making the objective lens system compact. Aberration characteristics of the Embodiment 1 are illustrated in FIG. 16.

Figure 5:
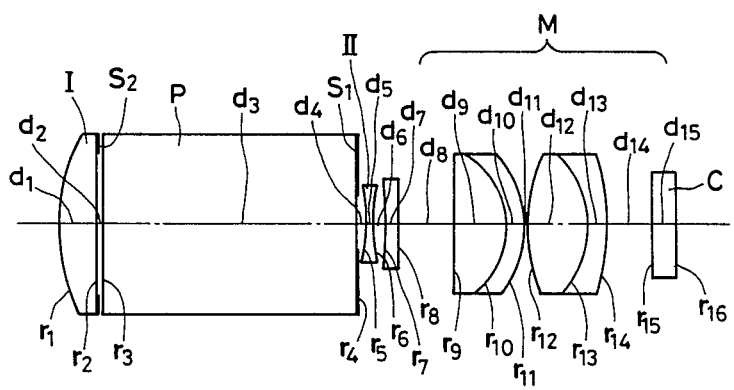
Figure 17:
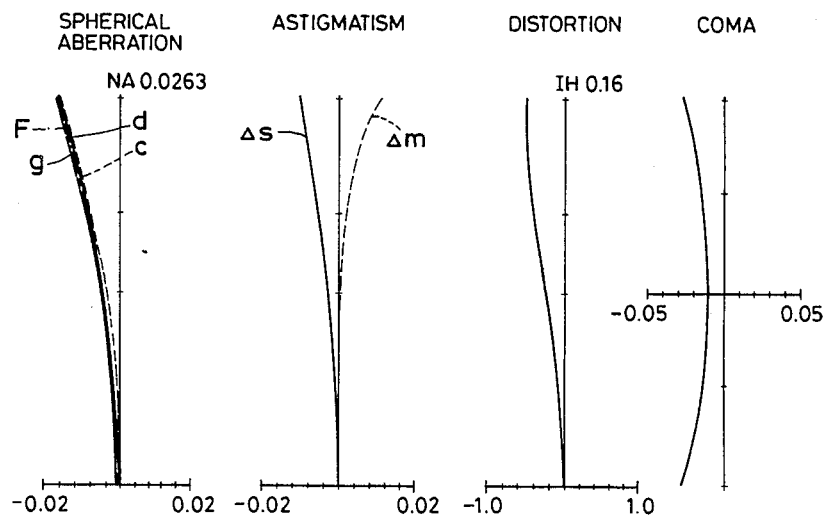
Figure 18:
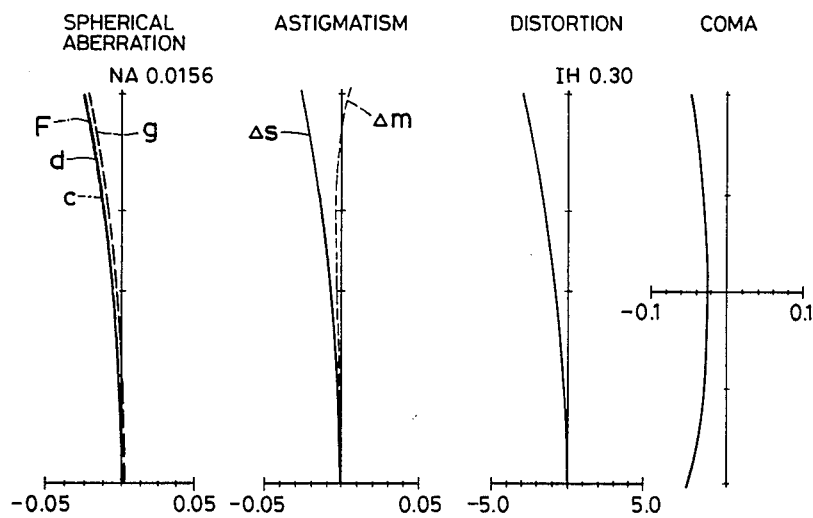

The Embodiment 2 has the composition illustrated in FIG. 5 similar to that of the Embodiment 1, except for the field angle which is set at 19.612° in the Embodiment 2. The Embodiment 2 uses the lens component I having power weaker than that in the Embodiment 1 in combination with the second lens component having weaker power accordingly. By arranging these lens components as the adapter lenses on the object side of the master lens M, the Embodiment 2 is designed for a field angle of 20° to permit observing object in a wider range. Aberration characteristics of the Embodiment 2 are illustrated in FIG. 17.

Figure 6:
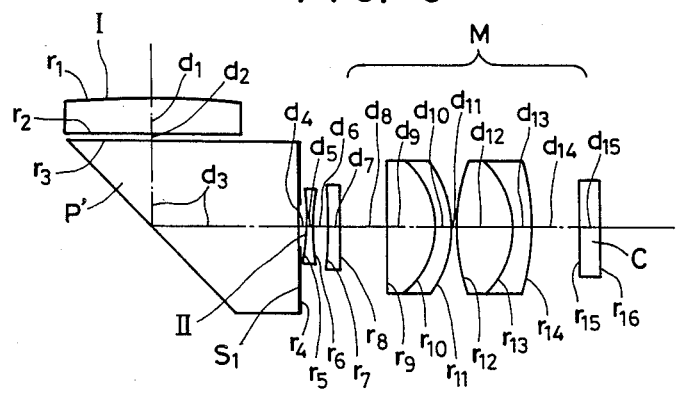

The Embodiment 3 has the composition shown in FIG. 6 and is different from either of the Embodiments 1 and 2 in that the former uses a side viewing prism P' in place of the plane parallel plate P and is designed for a field angle of 35°. Like the Embodiment 2, the Embodiment 3 adopts the first lens component I and second lens component II having weak powers respectively, and is designed for a field angle of 35° to permit observing objects in a wide range. Further, the side viewing prism P' enables to observe side walls within a narrow space. Aberrations, etc. are scarecely aggravated by using the side viewing prism P' in place of the plane parallel plate P.

Figure 7:
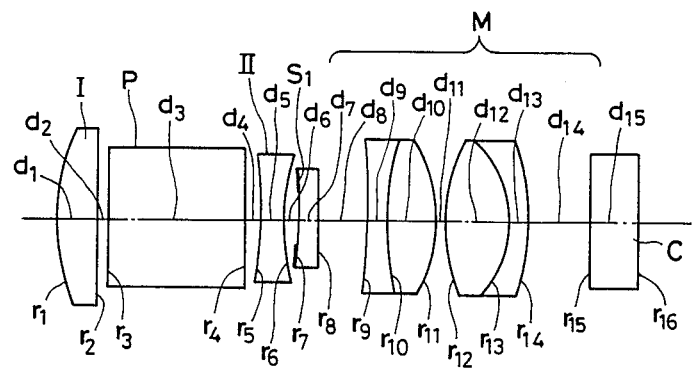
Figure 19:
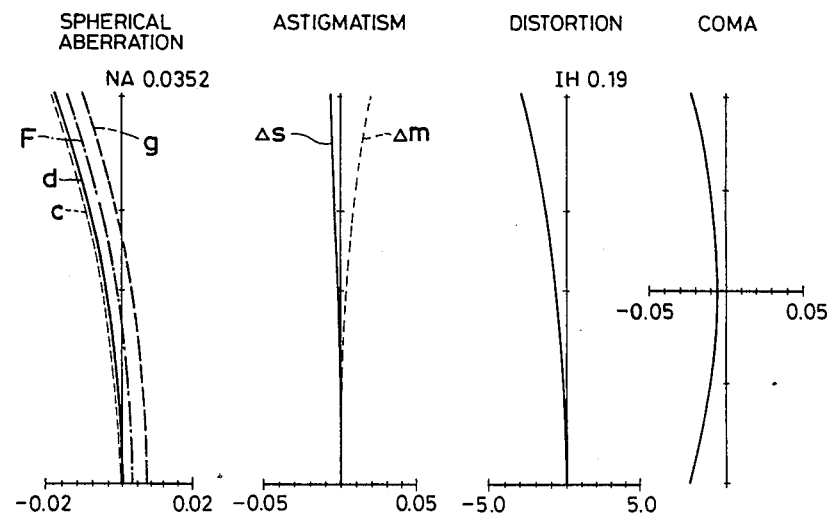
Figure 20:
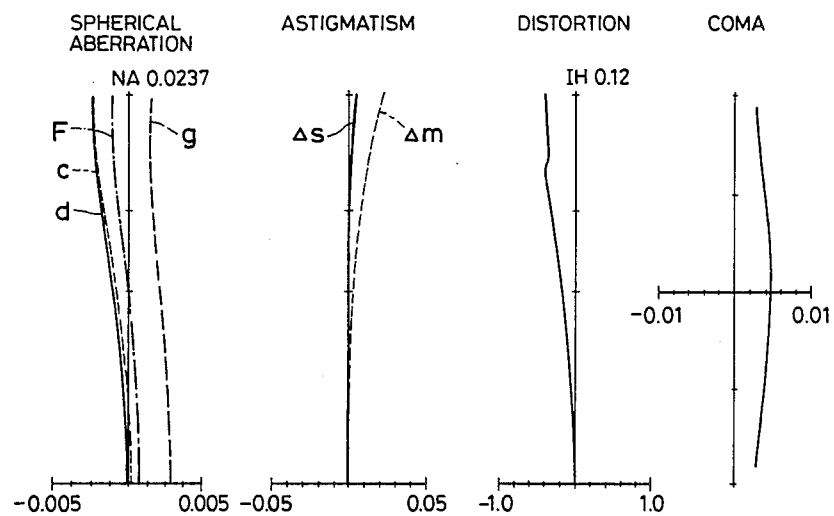

The Embodiment 4 has the composition illustrated in FIG. 7 and is different from the Embodiment 1, 2 or 3 in that the former uses the aperture stop $S_1$ which is arranged after the second lens component II. This arrangement prevents the rays from passing through the high portions of the master lens M and enables to design the objective lens system compact. Aberration Characteristics of the Embodiment 4 are illustrated in FIG. 19.

Figure 8:
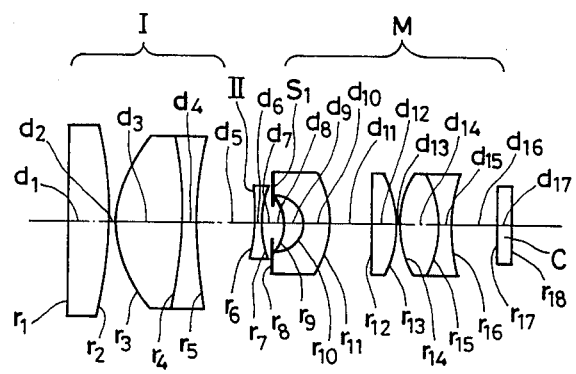
Figure 22:
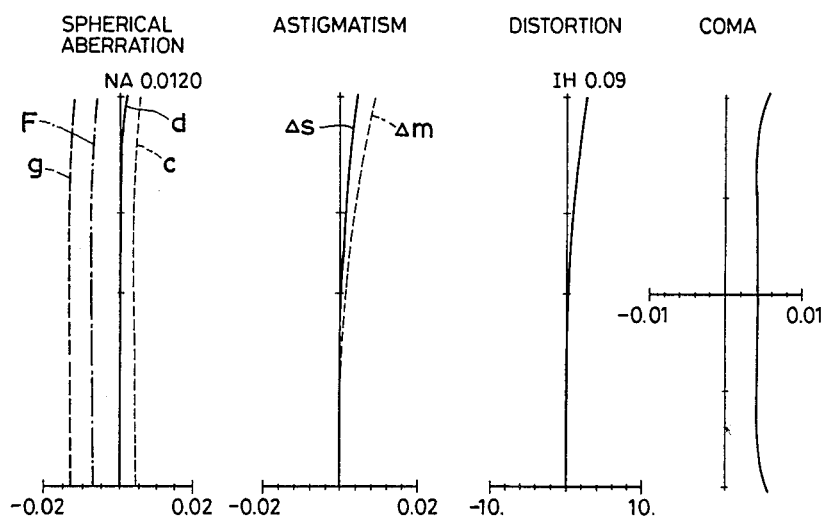

The Embodiment 5 has the composition shown in FIG. 8 and is different from any one of the Embodiments 1 through 4 in that the former adopts an achromatic doublet as the first lens component I. Speaking more concretely, the concave lens element serves for correcting the chromatic aberration produced by the convex lens element in the first lens component and has a high effect to correct the chromatic aberration. Aberration characteristics of the Embodiment 5 are illustrated in FIG. 22.

Figure 9:
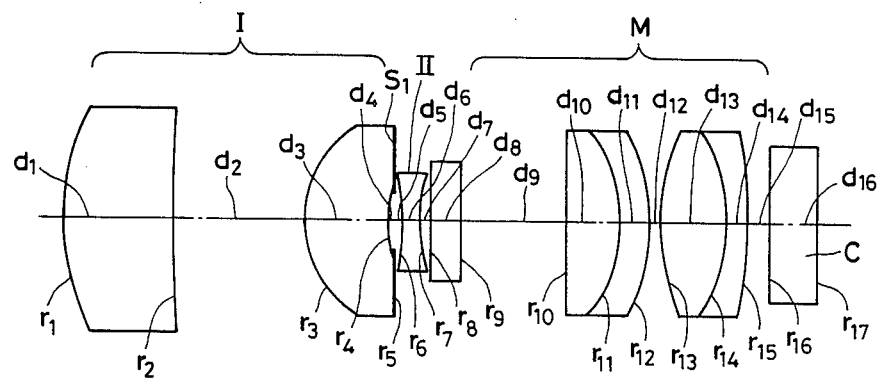
FIG. 9 through FIG. 11 show sectional views illustrating composition of Embodiment 6 of the objective lens system for endoscopes according to the present invention.
Figure 10:
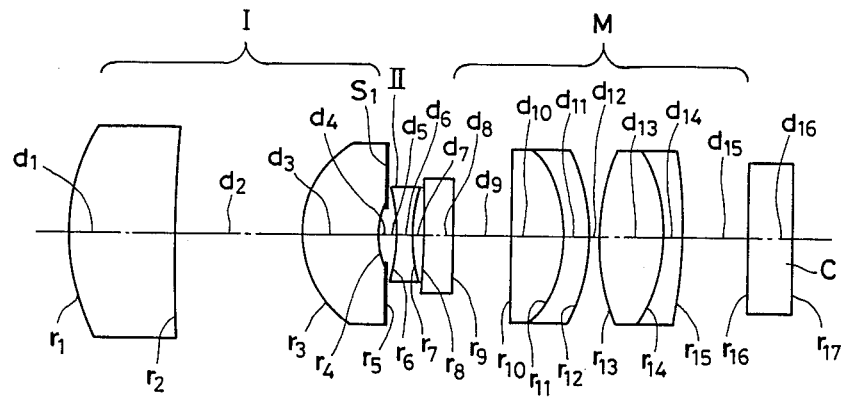
Figure 11:
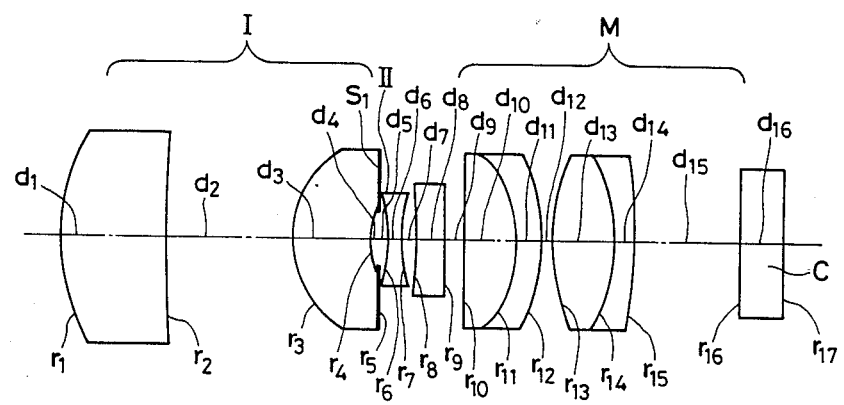

The Embodiment 6 has the composition shown in FIG. 9 and adopts the first lens component consisting of two convex lens elements. Out of these two convex lens elements, the one located on the image side is arranged in contact with the aperture stop $S_1$. Further, the master lens M is movable back and forth to perform focusing of the objective lens system. FIG. 10 and FIG. 11 show the master lens M located at different positions in the Embodiment 6. The master lens M is located at the rear position, intermediate position and front position in FIG. 9, FIG. 10 and FIG. 11 respectively. Variations of the airspaces caused by moving the master lens M to the positions shown in FIG. 10 and FIG. 11 respectively are shown in the numerical data.

By dividing the first lens component I into two convex lens elements as in the Embodiment 6, the refracting power of the convex lens component as a whole is strengthened, thereby making it possible to design the objective lens system compact.

Figure 21:
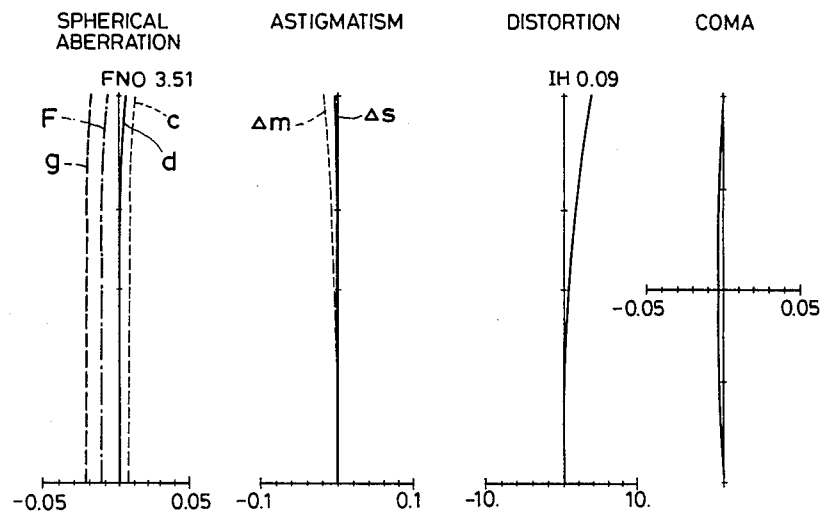
FIG. 21 through FIG. 23 show curves illustrating aberration characteristics of the Embodiment 6 of the present invention.
Figure 23:
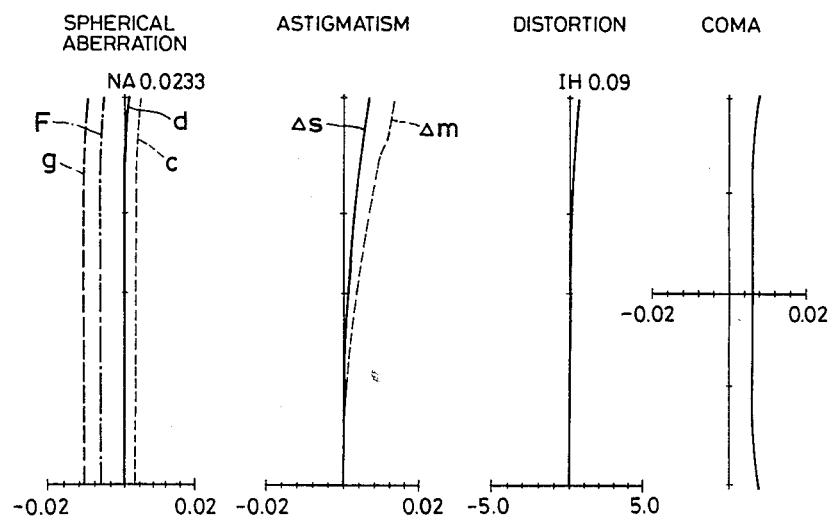

Further, by moving the master lens M back and forth, the objective lens system permits observing objects located at different distances even when it has a shallow depth of field. Since the image position is shifted forward by the positive function of the master lens M when the master lens M is moved forward, the objective lens system permits observing objects located at short distance. When the master lens M is moved to the rear position or the intermediate position, the objective lens system permits observing objects located at long distance or intermediate distance. In addition, either of the convex lens elements of the first lens component is a meniscus lens element having a convex surface on the object side. Aberration characteristics of the Embodiment 6 at the states shown in FIG. 9, FIG. 10 and FIG. 11 are illustrated in FIG. 21, FIG. 22 and FIG. 23 respectively.

Figure 12:
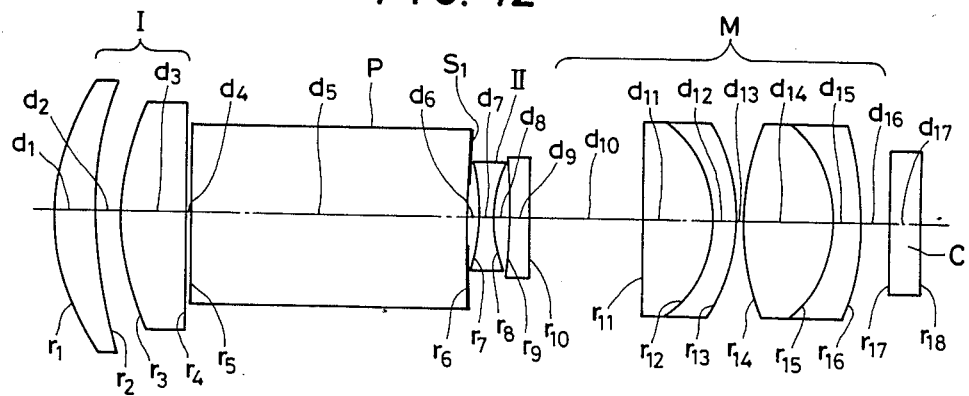
FIG. 12 through FIG. 14 show sectional views illustrating composition of Embodiment 7 of the objective lens system for endoscopes according to the present invention.
Figure 13:
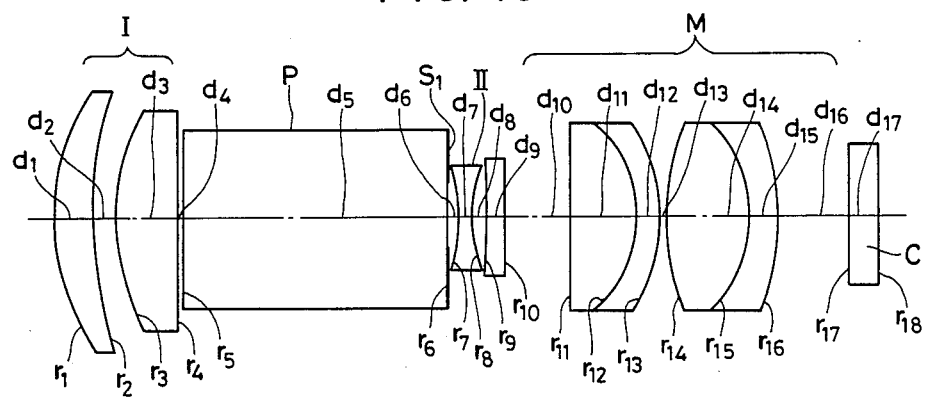
Figure 14:
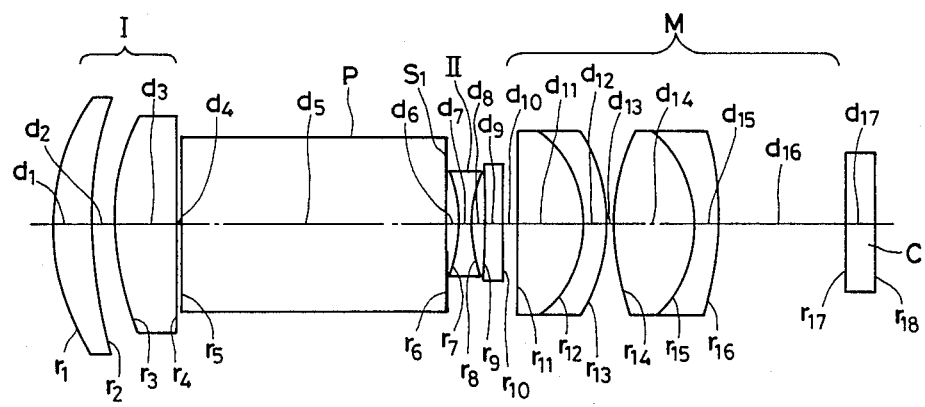
Figure 24:
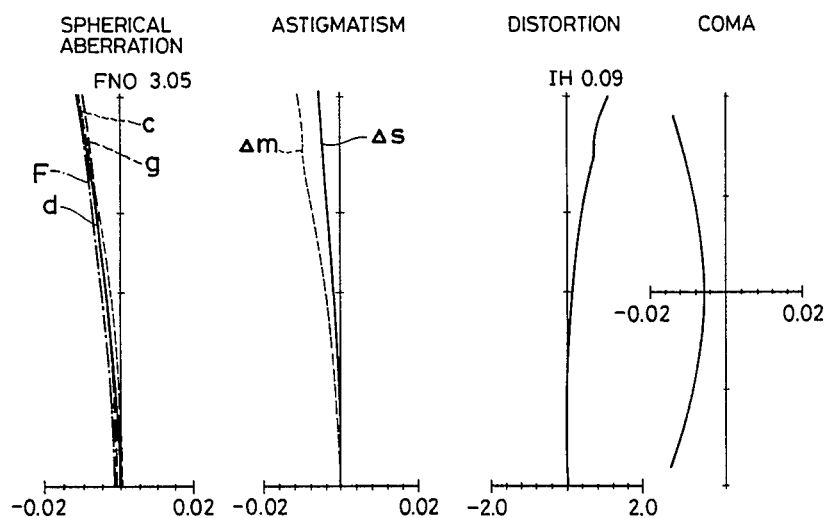
FIG. 24 through FIG. 26 show curves illustrating aberration characteristics of the Embodiment 7 of the present invention.
Figure 25:
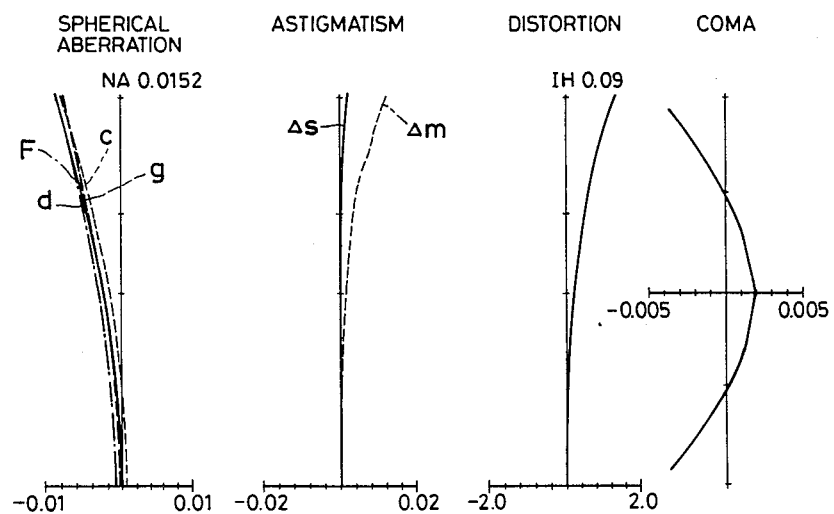
Figure 26:
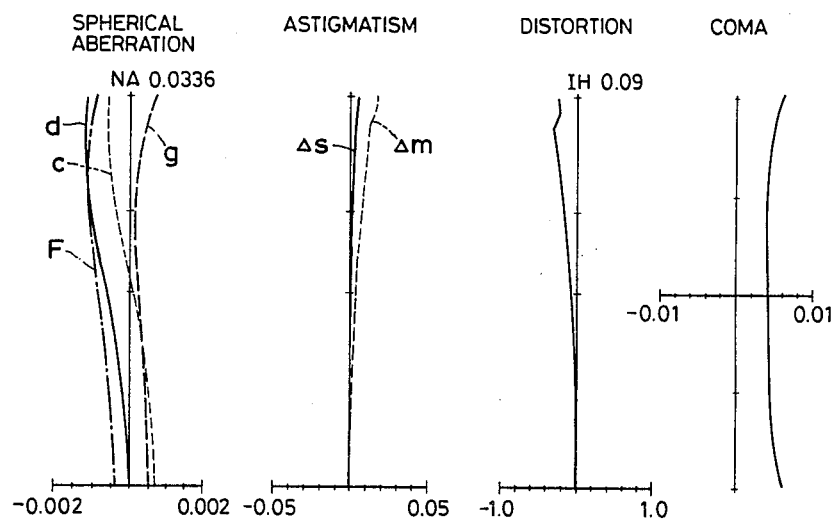

The Embodiment 7 comprises the master lens M which is to be moved to the positions shown in FIG. 12, FIG. 13 and FIG. 14 for focusing like that in the Embodiment 6. The Embodiment 7 is different from any one of the Embodiments 1 through 5 in that the former adopts the first lens component I consisting of two convex lens elements, a plane parallel plate and a movable master lens M. By adopting the first lens component consisting of two convex lens elements, it is possible to use elements of the first lens component having power weaker than that of the first lens component consisting of a single element at the same field angle and minimize production of coma. Aberration characteristics of the Embodiment 7 at the states shown in FIG. 12, FIG. 13 and FIG. 14 are illustrated in FIG. 24, FIG. 25 and FIG. 26 respectively.

Figure 15:
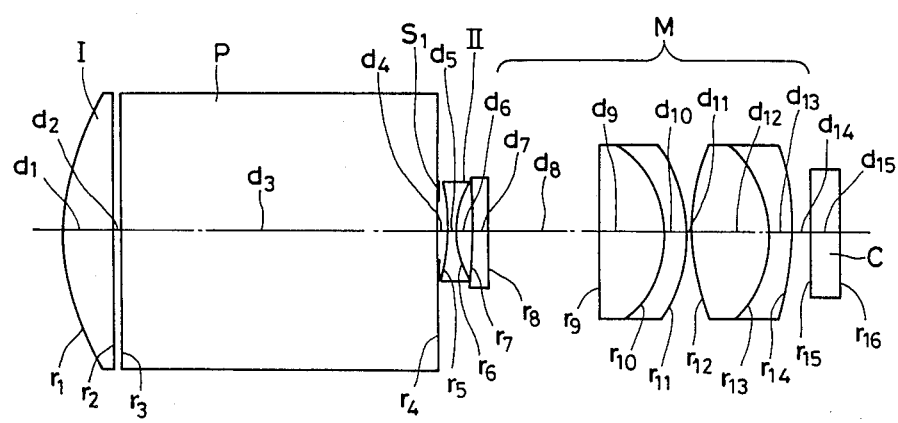
FIG. 15 shows a sectional view illustrating composition of Embodiment 8 of the objective lens system for endoscopes according to the present invention.

The Embodiment 8 has the composition shown in FIG. 15 and is different from the other embodiments in that the former uses an aspherical surface on the first lens component I. When the direction of the optical axis and the direction perpendicular thereto are taken as x axis and y axis respectively, shape of the aspherical surface is expressed by the following formula:

$$x = \frac{Cy^2}{1 + \sqrt{1 - pC^2y^2}} + \sum_{i=1}^{n} A_{2i}y^{2i}$$

wherein the reference symbol C is equal to 1/r, and the reference symbols p and $A_{2i}$ are coefficients of aspherical surface defined in the numerical data.

Figure 27:
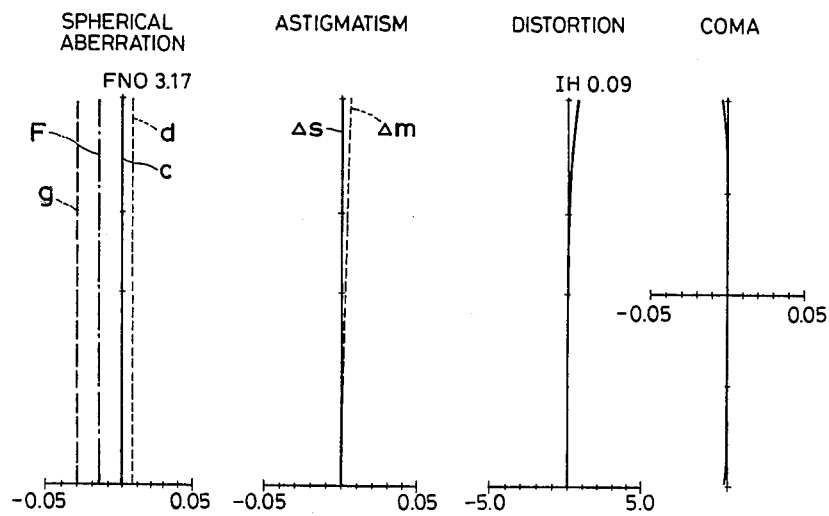
FIG. 27 shows curves illustrating aberration characteristics of the Embodiment 8 of the present invention.

By adopting the aspherical surface, the Embodiment 8 corrects coma due to difference in refractive power at peripheral portions of the lens elements. Aberration characteristics of the Embodiment 8 are illustrated in FIG. 27.

In each of the Embodiments described above, the master lens M is designed for a field angle of approximately 40°.

When an attempt is made to obtain a master lens having a field angle of 60° or larger for compact design on an objective lens system for endoscopes like the objective lens system according to the present invention, it is obliged to strengthen refractive powers of the first lens component I and the second lens component II. In such a case, aberrations will undesirably be produced. In order to correct the aberrations, it is obliged to use a large number of lens elements for each lens component, thereby inevitably enlarging the lens system and increasing manufacturing cost therof. Further, when the master lens having a field angle of 60° or larger is employed singly for observation, it forms remarkably distorted and unnatural images. Taking this point into consideration, the master lens should generally have a field angle within a range from 25° to 45° and the Embodiments select field angles around 40°.

As is understood from the foregoing descriptions, the objective lens system for endoscopes according to the present invention is usable in various types of endoscopes such as flexible endoscopes, non-flexible endoscopes and video scopes, designed for a field angle smaller than 40°, has little coma and astigmatism, and exhibits favorable performance providing images scarcely degraded by chromatic aberration.

I claim:

1. An objective lens system for endoscopes having a field angle of 40° or smaller and comprising a first lens component arranged on the extreme object side in said objective lens system and having positive refractive power as a whole;

a master lens arranged on the extreme image side in said objective lens system and having positive refractive power and comprising a lens component arranged on the extreme object side in said master lens and having positive refractive power and an aperture stop arranged between said first lens component and said master lens.

2. An objective lens system for endoscopes according to claim 1 wherein focal length $f_I$ of said first lens component satisfies the following condition (1):

$$0.3 < f_I/f < 200 \quad (1)$$

wherein the reference symbol f represents focal length of the objective lens system as a whole.

3. An objective lens system of endoscopes as claimed in claim 2 wherein said first lens component is attachable and detachable.

4. An objective lens system for endoscopes according to claim 3 wherein said first lens component is a positive lens having a strongly convex surface on the object side and said second lens component is a biconcave lens.

5. An objective lens system for endoscopes according to claim 3 wherein said first lens component is a positive lens having a strongly convex surface on the object side and said second lens component is a negative meniscus lens having a convex surface on the object side.

6. An objective lens system for endoscopes as claimed in claim 2 wherein a second lens component is arranged between said first lens component and said extreme object side lens component arranged in said master lens.

7. An objective lens system for endoscopes according to claim 6 wherein focal length $f_{II}$ of said second lens component satisfies the following condition (2):

$$0.05 < |f_{II}/f| < 100.$$

8. An objective lens system for endoscopes according to claim 6 or 7 wherein a master lens is arranged on the image side of said second lens component, and said first lens component is designed so as to be attachable and detachable.

9. An objective lens system for endoscopes according to claim 8 wherein a plane parallel plate is arranged between said first lens component and said second lens component, and Abbe's number $\nu_p$ of said plane parallel plate satisfies the following condition (5):

$$\nu_p < 55.$$

10. An objective lens system for endoscopes according to claim 8 wherein a plane parallel plate is arranged between said first lens component and the master lens, and Abbe's number $\nu_p$ of said plane parallel plate satisfies the following condition (5):

$$\nu_p < 55.$$

11. An objective lens system for endoscopes according to claim 6 or 7 wherein a master lens is arranged on the image side of said second lens component, and said first lens component and said second lens component are designed so as to be attachable and detachable respectively.

12. An objective lens system for endoscopes according to any one of claims 7, 8, or 11, wherein said objective lens system is focussed by moving said master lens.

13. An objective lens system for endoscopes according to any one of claims 1, 2, 3 or 6 wherein Abbe's number $\nu_I$ of at least one of convex lens elements in said first lens component satisfies the following condition (4):

$$\nu_I > 32.$$

14. An objective lens system for endoscopes according to any one of claims 3, 6 or 7 wherein focal length $f_M$ of said master lens satisfies the following condition (3):

$$0.1 < f_M/f < 1.$$

15. An objective lens system for endoscopes according to claim 14, wherein said objective lens system is focussed by moving said master lens.

16. An objective lens system for endoscopes according to claim 1 wherein said first lens component is a positive lens having an aspherical surface.

* * * * *